(12) United States Patent
Philbin (10) Patent No.: US 10,044,857 B2
(45) Date of Patent: Aug. 7, 2018

(54) SYSTEM AND METHOD FOR INITIATING AN EMERGENCY RESPONSE (71) Applicant: Shelter Inc., Asbury Park, NJ (US)

(72) Inventor: Matthew Joseph Philbin, Asbury Park, NJ (US)

(73) Assignee: SHELTER INC., Asbury Park, NJ (US)

( * ) Notice: Subject to any disclaimer, the term of this patent is extended or adjusted under 35 U.S.C. 154(b) by 0 days.

(21) Appl. No.: 15/473,163

(22) Filed: Mar. 29, 2017

(65) Prior Publication Data

US 2017/0289350 A1 Oct. 5, 2017

Related U.S. Application Data (60) Provisional application No. 62/390,418, filed on Mar. 30, 2016, provisional application No. 62/392,025, filed on May 19, 2016.

(51) Int. Cl.
H04M 11/00 (2006.01)
H04M 3/51 (2006.01)
G08B 25/01 (2006.01)
H04L 29/08 (2006.01)

(52) U.S. Cl.
CPC ......... H04M 3/5116 (2013.01); G08B 25/016 (2013.01); H04L 67/146 (2013.01)

(58) Field of Classification Search
None
See application file for complete search history.

(56) References Cited

U.S. PATENT DOCUMENTS

| 8,989,698 B2* | 3/2015 | Fan | H04W 4/02 379/37 |
| 2003/0012344 A1* | 1/2003 | Agarwal | H04M 11/04 379/37 |
| 2009/0201147 A1* | 8/2009 | Gottlieb | G08B 25/016 340/539.12 |

(Continued)

OTHER PUBLICATIONS

International Search Report and Written Opinion of International of the International Searching Authority/Europe for International Application No. PCT/US2017/024816 dated Jun. 20, 2017.

Primary Examiner — Stella Woo
(74) Attorney, Agent, or Firm — Procopio, Cory, Hargreaves & Savitch LLP (57) ABSTRACT A system and method for initiating a personal emergency response is disclosed. The method can include receiving an emergency communication via a virtual assistant, spoken by a user and an urgent situation or an emergency situation. The emergency communication can be processed to determine the nature of the emergency communication and translate the emergency communication into an emergency data message having a digital representation of information related to the emergency communication. If the emergency communication indicates an urgent situation, the system can contact an emergency contact based on stored user preferences. If the emergency communication indicates an emergency situation, then the system can aid in the dispatch of emergency services and provide information about the user to provide a measured response to the emergency communication.

20 Claims, 3 Drawing Sheets (56) References Cited

U.S. PATENT DOCUMENTS

| | | | |
|---|---|---|---|
| 2015/0022342 A1 | 1/2015 | Will et al. | |
| 2016/0036974 A1* | 2/2016 | Strom | H04M 3/5191 |
| | | | 455/404.1 |
| 2016/0071399 A1* | 3/2016 | Altman | G10L 15/02 |
| | | | 340/539.11 |
| 2016/0142894 A1* | 5/2016 | Papakonstantinou | H04W 4/023 |
| | | | 455/404.1 |

* cited by examiner

SYSTEM AND METHOD FOR INITIATING AN EMERGENCY RESPONSE

CROSS REFERENCE TO RELATED APPLICATIONS

This application claims priority to U.S. Provisional Patent Application 62/390,418, filed, Mar. 30, 2016, entitled "AUTOMATED VOICE-CONTROLLED PERSONAL EMERGENCY RESPONSE SERVICE," and U.S. Provisional Patent Application 62/392,025 filed, May 19, 2016, entitled "SYSTEM FOR PROCESSING CALLING PARTY MEDICAL INFORMATION FOR 911 EMERGENCY SERVICES," the contents of which are hereby incorporated by reference in their entirety.

BACKGROUND

Technical Field

This disclosure relates to communications during emergency situations in the home. More specifically, the disclosure relates to systems and methods for providing an automated voice-controlled Personal Emergency Response System (PERS).

Related Art

Some emergency communication and response systems can feature a wearable wireless device having a button that a user can activate, for example, in case of an emergency or in the even there is an acute need for assistance. Upon activation of the button, a signal may be transmitted from the wireless device to a receiving device in the home. The receiving device may be connected to a telephone landline, public switched telephone network (PSTN), or plain-old telephone service (POTS) and initiate a connection to a designated call center. The call center can receive a message indicating that the user needs assistance. The call center may be staffed 24 hours a day, 7 days a week by agents to respond to users' requests for assistance. An agent in the call center then attempts to communicate with the user through the receiving device in the user's home, to assess the nature of the emergency and determine an appropriate response.

In order for these systems to be effective, the user must have the wireless device within reach in order to activate the system. However, the user may forget to put it on, not wear it consistently, take it off for one reason or another, or the user may find the need to wear the wireless device to be a stigmatizing sign of feebleness and therefore not wear it at all. Thus, if there is a sudden need for services the device may not be in reach.

There are over 6,000 Public Safety Answering Points (PSAPs) in the United States. A PSAP is a call center responsible for answering calls to an emergency telephone number (e.g., 911), for police, firefighting, and ambulance/Emergency Medical Services (EMS). Trained operators (telecommunicators) are responsible for dispatching emergency services in response to emergency calls. Many PSAPs are E911-enabled, meaning the PSAP can determine the calling party's physical location for calls placed over a landline telephone service or Voice over IP (VoIP) telephony. Caller identification (ID) Number services provide the calling party's telephone, number and Caller ID Name (CNAM) provides the calling party's name. Caller ID Number and Caller ID Name information can be displayed on computer monitors at the telecommunicator's work station. The telecommunicator can determine the nature of the emergency and dispatch the appropriate first responders to the calling party's location.

However, many individuals have dispensed with landlines in favor of mobile or cellular phones, leaving no landline upon which to determine physical location. Moreover, there is no nationwide method and system enabling automatic identification and delivery of information specifying the originating calling party's personal medical information to the telecommunicator in the event of a medical emergency.

SUMMARY

An aspect of the disclosure provides a method for initiating a personal emergency response. The method can include storing personal information and contact information for one or more emergency contacts in a computer memory. The method can include receiving an emergency communication via a virtual assistant. The emergency communication can be spoken to the virtual assistant by a user. The emergency communication can indicate one of an urgent situation and an emergency situation. The method can include processing the emergency communication at a voice processing system coupled to the virtual assistant to determine the nature of the emergency communication and translate the emergency communication into an emergency data message. The emergency data message having a digital representation of information related to the emergency communication. If the emergency communication indicates an urgent situation, the method can include transmitting, via a communication network, the emergency data message to an emergency contact based on the contact information in the memory and transmitting a message causing the virtual assistant to indicate that at least one message has been transmitted to the one or more emergency contacts saved in the computer memory. If the emergency communication indicates an emergency situation, the method can include transmitting, via the communication network, the emergency data message to a public safety answering point (PSAP) and transmitting a message causing the virtual assistant to transmit an audio message indicating that an emergency service provider has been dispatched route to the home.

Another aspect of the disclosure provides a method for initiating a personal emergency response. The method can include storing personal information about a user in a computer memory. The method can include receiving an emergency communication via a virtual assistant. The emergency communication can be spoken to the virtual assistant by the user. The method can include processing the emergency communication at a voice processing system communicatively coupled to the virtual assistant to translate the emergency communication into an emergency data message. The emergency data message can include a digital representation of information related to the emergency communication. The method can include transmitting, via a communication network, the emergency data message to one or more responder devices.

Another aspect of the disclosure provides a personal emergency response system. The personal emergency response system can have a memory. The personal emergency response system can have one or more processors coupled to the memory. The one or more processors can store personal information about a user in the memory. The one or more processors can receive an emergency communication via a virtual assistant located within a home. The emergency communication can be spoken to the virtual assistant by the user. The one or more processors can process the emergency communication to translate the emergency communication into an emergency data message. The emergency data message can include a digital representation of information related to the emergency communication. The one or more processors can transmit, via a communication network, the emergency data message to one or more responder devices. The one or more processors can receive a communication from the one or more responder devices in response to the emergency data message indicating receipt of the emergency data message.

Other features and details will become apparent with a review of the following detailed description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

PSAPs utilize a wide variety of telecommunication service and equipment providers, computer systems and radio dispatch technology. The disparity of technology can increase the difficulty of creating and implementing services that can automatically identify the calling party (e.g., the user) and deliver the calling party's personal medical information.

Allowing access to personal medical information controlled by the individual calling party, a caregiver, or guardian can expedite medical treatment in an emergency. Such information may include, but is not limited to, the individual's age, medical conditions, allergies, medications, blood type, and the nature of any recent hospitalizations.

Some systems can allow access to personal medical information, but do not provide sufficient security or privacy of the calling party. For example, access to an individual's medical information can based on matching a caller ID number to a stored caller ID number in a database associated with the personal medical information. Another example may provide access via an access code or personal identification number (PIN), entered by the telecommunicator prior to obtaining the personal medical information. These forms of access and other similar systems may not be feasible due to financial and logistical reasons. Certain issues remain with respect to ownership and maintenance of databases including the medical history information that prevent these kinds of systems from being implemented while maintaining security and privacy, particularly in view of the Health Insurance Portability and Accountability Act (HIPAA), a comprehensive health privacy law that regulates the use and disclosure of Protected Health Information (PHI).

Many of the companies offering home medical alert services offer a subscribing customer the means for providing personal medical information that is electronically stored and accessible to medical alert call center agents. In the event the subscriber experiences a medical emergency, the party placing the call to 911 may be the medical alert call center. That operator must verbally provide the subscriber's premises address and personal medical information to the 911 telecommunicator. It is a time-consuming and error-prone process. Medical alert companies do not have the means for automatically and electronically providing personal medical information for display on computer monitors at the telecommunicator's work station or the emergency first responders.

The present disclosure describes a system and method for providing an automated voice-controlled PERS. The PERS can use a decentralized, or cloud-based natural-language-understanding and text-to-speech/speech-to-text service that provides a communication link between the subscriber or user at home and emergency services dispatchers. One or more internet-connected receiving devices can be placed in the user's home. The receiving device, which may have one or more microphones, a loudspeaker, and a special-purpose processor and can be associated with a virtual assistant, for example, listens constantly, awaiting a command or query from the user. When in need of assistance, the user can speak a verbal command. The automated system can communicate with the user to determine which of the user's pre-registered responders should be contacted. The responders can be one or more emergency contacts registered by the user, or emergency services such as an ambulance, police assistance, or fire department. The system can contact the appropriate responder via a text message and/or an automated phone call. The responder can be asked to reply via a web app or be return communication to indicate whether he or she can assist the user. The system can then report such information back to the user in an interactive manner.

The disclosure provides methods and systems for an individual, guardian, caregiver, medical professional or other organization or service to have access to an individual's personal medical information, collectively referred to herein as a "personal health record", as well as the ability to share information with the consent of the individual, or caregiver, in a medium which provides access to the information in the quickest response time. The disclosure utilizes telephony hardware, Internet Protocol (IP) telephony services, the internet, and PSTN to access and share this information.

An aspect of the disclosure relates to methods and systems for defining the personal health record of an individual in a database to be shared with a 911 telecommunicator, an emergency responder, a hospital emergency room or other organization or service.

Another aspect of the disclosure relates to methods and systems for a 911 telecommunicator, an emergency responder, a hospital emergency room or other organization or service to access and obtain the personal health record of an individual from a database.

Another aspect of the disclosure relates to devices providing a unique identifying short universal resource locator (URL) associated with an individual and which provides access to their personal health record.

Another aspect of the disclosure may be to improve over the state of the art in the medical alert industry. The disclosure describes a system and method for providing a voice-controlled Personal Emergency Response Service (PERS), utilizing cloud-based natural-language-understanding and text-to-speech services for alerting emergency contact, emergency services, and sharing information.

An aspect of the disclosure relates to methods and systems to provide emergency responders with the user's front door keyless entry code, if applicable, or the code for a lockbox containing a key to the user's front door, if applicable. The ability to expedite entry to the user's home without breaking down the front door can save valuable time in a medical emergency.

Figure 1:
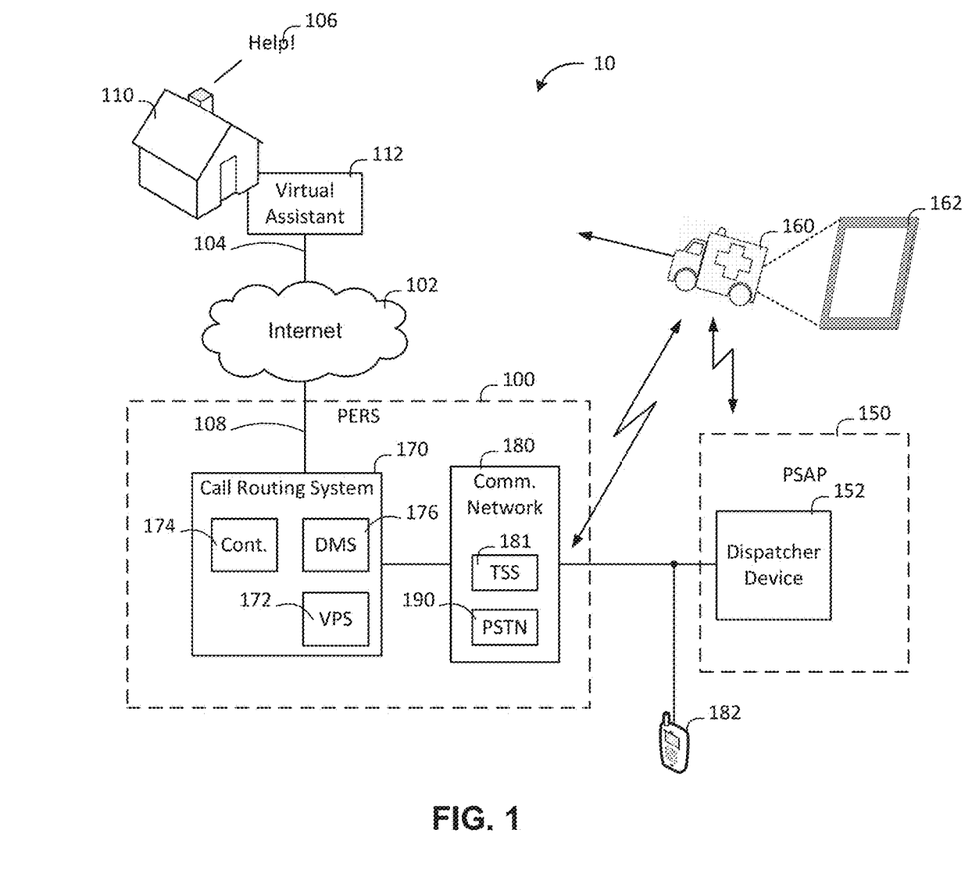
FIG. 1 is a graphical representation of a system for transmission of emergency calls and dispatch of emergency services using a personal emergency response system.

FIG. 1 is a graphical representation of an embodiment of a system for transmission of emergency calls and dispatch of emergency services using a personal emergency response system. In the figure, certain aspects of the system are represented by functional blocks. A communication system 10 can have a personal emergency response system (PERS) 100. The PERS 100 can receive an emergency communication 106 indicating a need for emergency response from, for example, an injured individual in a home 110. For example, the emergency communication 106 from the injured person, may include, "I fell and think I broke my hip"; "I have chest pains"; "I am having difficulty breathing"; "I think I'm having a stroke". "There is a strong smell of natural gas," "The pot on the stove is on fire". "Someone is trying to break into my home," "I can't get off the toilet," or other emergency communication. The injured individual or individual in need of assistance using the PERS 100 may also be referred to herein as a user or subscriber. The home 110 may have more than one user or subscriber registered for use in the home 110. While the user of the PERS 100 (e.g., a subscriber to the service) may be used as the primary example herein, it should be appreciated that anyone in the home 110, including bystanders, can provide the emergency communication 106. While the home 110 is used as a primary example throughout the disclosure, it should be appreciated that the disclosure is equally applicable in a commercial setting. Multiple users can be associated with the PERS 100.

In general, the emergency communication 106 can be categorized as urgent or emergency. An "urgent situation," as used herein, can be distinguished from an emergency situation as a situation that is generally non-threatening to life, limb, or safety. As such, a scale from "urgent" to "emergency" is subjective and may have many nuances, and it should be appreciated that designation as urgent or emergency in this disclosure may be made for ease of description and example, and not by way of limitation. The nature of the emergency communication 106 can determine what response is needed and what responder or responders are contacted. The designation as urgent or emergency may further be made by the user in the emergency communication 106.

The term "responder" as used herein may refer generally as an entity receiving a message or other notification from the PERS 100 in response to the emergency communication 106. A responder can be an urgent responder (e.g., an emergency contact designated by the user), a dispatch center, and in some cases, an emergency responder as indicated by the nature of the situation (e.g., fire, police, ambulance).

In an urgent situation, the PERS 100 may contact one or more urgent responders, or people identified by the subscriber as an emergency contact (e.g., friend, a neighbor or family member). The emergency communication 106 can also indicate an emergency situation that may be, for example, threatening in some way to the user's life, limb, or safety. In such a circumstance, the PERS 100 can alert 911 emergency services and/or one or more emergency contacts as well. These features are described in more detail below.

"911 emergency services" is used herein as the primary example herein, however other systems or methods are possible to provide the PERS 100 access to emergency services. For example, dialing or otherwise contacting emergency services associated with "112" in the European Union may provide a similar capability for the PERS 100 that is employed internationally. As such "911 emergency services" and the associated PSAP 150 can also be the emergency services counterpart or dispatching system employed in a foreign country.

The PERS 100 can route the emergency communication 106 and other information about the emergency and the injured individual to a PSAP 150 via the Internet 102 or other communication networks, as described below. The PSAP 150, or a 911 call center, can dispatch emergency services such as an emergency responder 160 to the home 110 in response to the emergency communication 106. The emergency responder 160 can be, for example, emergency medical services (EMS) or paramedics, police, fire department, an applicable first responder service, or other emergency service provider.

The home 110 can have a virtual assistant 112. The virtual assistant 112 can receive verbal commands (from, e.g., the user) such as the emergency communication 106 and convert the received audio into data. The data can be sent via, for example, from the virtual assistant 112 via a Wi-Fi connection 104 over the internet 102 and an IP connection 108 to a call-routing system (CRS) 170. The CRS 170 can be a distributed network of systems that are not necessarily collocated. The CRS 170 can operate such distributed systems at least in part via cloud computing, for example. The CRS 170 can have, for example, a Voice Processing System (VPS) 172. The VPS 172 can translate natural-language data to audio data, providing, among other things, text-to-speech, natural language understanding, and speech-to-text services. These are described in more detail below.

The CRS 170 can also have a controller 174. The controller 174 can have one or more processors, microprocessors, micro controllers, and/or at least one central processing unit (CPU) related to specific call routing and subscription services connecting the user in the home 110 to emergency services via the PSAP 150. The functions of the controller 174 can be implemented in software, firmware, and/or hardware across one or more processors that are not necessarily collocated. In addition, the one or more processors and associated software can be implemented using cloud computing.

The controller 174 can be coupled to a data management system (DMS) 176. The DMS 176 can have one or more databases configured to store, access, and manage various data regarding, for example, the user or user profile, medical history, subscription services, incident reports, and call routing. These features are described in more detail in connection with FIG. 2. As used herein, the term "coupled" or "communicatively coupled" refers to a communication link between components or locations. The communication link can be, for example, a voice or data link via a wireless or wireline connection. The components or locations can be directly connected or remotely connected over a distance or via one or more intermediate components or locations by a communication network, such as the Internet 102 or a variety of mobile network.

The CRS 170 can provision a trunk, or connection, via a communication network 180. The communication network 180 can enable communication between the digital or IP-based communications of the virtual assistant 112 over the Internet 102 to another protocol or communication system. The communication network 180 can switch calls between VoIP users and PSTN users, for example. The communication network 180 can also switch calls between packet switched networks and circuit switched networks, for example. The communication network 180 can connect IP communications to analog and/or digital telephone extensions associated with the PSTN 190. The communication network 180 can have IP connectivity (e.g., Internet 102) and may provide additional audio, video, or instant messaging communication capabilities utilizing the TCP/IP protocol stack. The communication network 180 can have one or more processors and associated memories configured to enable or facilitate voice and/or data communications between the virtual assistant 112 in the home 110 and, for example, a dispatcher device 152 at the PSAP 150 or a contact device 182 in the possession of an urgent responder (e.g., an emergency contact) identified by the user. The contact device 182 can also be termed a responder device because it can receive a message from the PERS 100 in response to the emergency communication 106.

In some embodiments, the communication network 180 can have a telephone switching system (TSS) 181. The TSS 181 can be an internet-based telephone system or telephone switching system that can couple internet communications to communications over another network such as the PSTN 190 or a cellular network for transmission to the PSAP 150 or the contact device 182. In some examples, the TSS 181 can be an Internet Protocol Private Branch Exchange (IP PBX).

For ease of description, the TSS 181 may be used as a primary example in this disclosure, however, other connections between the virtual assistant 112, the dispatcher device, and the contact device 182, are possible. For example, the CRS 170 can use IP network routing or various switching networks to provide a communications path from the virtual assistant 112 to the PSAP 150 and the contact device 182. In some implementations, a direct, packet or IP-based communication link can be established. In some other implementations, an IP PBX as the TSS 181 can switch VoIP telephony to the PSTN 190 for communications with the PSAP 150, for example.

The controller 174 can associate the user (via the virtual assistant 112) with a VoIP telephony number assigned at the communication network 180, by, for example the TSS 181. The dispatcher device 152 can receive data related to the user in addition to one or more text messages related to the emergency communication 106. As described more fully below, the dispatcher device 152 can receive a message indicating a "short URL" 245 (FIG. 2) that can link to the user's personal health record, for example. The dispatcher device 152 can also communicate with the home 110 (e.g., the virtual assistant 112) regarding the nature of the emergency communication 106. This can allow the user to verbally communicate (via, e.g., the virtual assistant and the VPS 172) with the dispatcher device 152. Such communication can be facilitated by the VPS 172. Individuals at the PSAP 150 can then communicate with, and dispatch the emergency responder 160 to the home 110. In some embodiments, the dispatcher device 152 can be a computer console, or display used at the PSAP 150 for dispatching and routing of the emergency responder 160.

The communication network 180 can provide a connection to the CRS 170 on a VoIP connection and to the PSAP 150 via the PSTN 190, for example. This can enable the virtual assistant 112, coupled to the IP connection 108 on the home network 120, to connect with the PSAP 150 through PSTN 190. The communication network 180 (via, e.g., the TSS 180) can also process and route calls to the PSAP 150 closest to the subscriber's premises, for example. In some other embodiments, the communication network 180 can provide a link by which the virtual assistant 112 can send a message or create a link with the PSAP 150 and contact device 182.

In some embodiments, the emergency responder 160 can have an emergency responder device 162. The emergency responder device 162 can be a smartphone, tablet, or other mobile electronic device. The emergency responder device 162 can receive communications from the PSAP 150, for example. In some embodiments, the emergency responder device 162 communications may include the short URL (e.g., in place of, or in addition to a caller ID number) allowing the responder to access and view medical information about the subscriber on the emergency responder device 162 via, for example, a web portal and network communications. Advance notification of the subscriber's medical history and particular needs can aid in tailoring an appropriate or measured medical response upon arrival at the home 110. This is described in further detail in connection with FIG. 2.

The emergency responder device 162 can be communicatively coupled to the PSAP 150 or the dispatcher device 152 via a mobile communications network (e.g., cellular) or other wireless protocols. The emergency responder device 162 can further be coupled to the CRS 170 via the communication network 180 and receive information related to the emergency communication 106 and/or the user. The emergency responder device 162, using the short URL and internet access, can receive personal medical data of the user from the DMS 176. The virtual assistant 112 can thus communicate with the user to determine the nature and extent of the emergency and transmit that information to emergency responder device 162. For example, if the user says "call 911 I'm hurt", the virtual assistant 112 can place an emergency call to the PSAP 150 and provide information regarding the user's medical history. The same action can also include notifying the user's emergency contacts or sending the emergency contacts a text message or placing a voice call to them. Further, the virtual assistant 112 can interact with the user to hone in on specific issues. For example, the virtual assistant 112 can ask further questions, such as "what's wrong? Are you in pain? Where does it hurt?" Triage, by the virtual assistant 112, in this manner can ensure the PSAP 150 dispatches an appropriate emergency responder 160, and that the emergency responder 160 provides the proper care, tailored to the emergency communication 106 and the user's needs.

In some embodiments, the virtual assistant 112 and the PERS 100 as a whole can determine a location of the user within the home 110, based on the physical location of the virtual assistant 112. For example, the virtual assistant may be located near a bathroom, where statistics have shown that 35% of falls at night occur. The virtual assistant 112 can interact with the user via a series of inquiries based on the location of the virtual assistant 112 within the home. Further statistics have shown that a disproportionate number of calls to 911 are for a "lift" emergency, meaning the user/subscriber/individual needs help getting up off the toilet. In such a circumstance the PERS 100, through the virtual assistant 112, can triage the situation and determine that fewer resources are needed in such a "lift" instance. The profile data webpage displayed on the 911 monitor is constantly refreshed with the user-provided data.

The medical information provided to the dispatcher device 152 and the emergency responder device 162 can include medical history of the user. In some examples, the dispatcher device 152 and the emergency responder device 162 can send and receive Standard Messaging Server (SMS) or Multimedia Messaging Service (MMS) messages related to the emergency communication 106. SMS and MMS messages are generally referred to herein as text messages. The dispatcher device 152 and the emergency responder device 162 can also send and receive text messages with the CRS 170 that can then be received at the virtual assistant 112 and transmitted as an audio file to the user. This can allow further communication with the user in event of an emergency. For example, the user can receive reassuring audio messages such as "Remain calm. Help is on the way," or "An ambulance has been dispatched and will arrive in 15 minutes or less."

Figure 2:
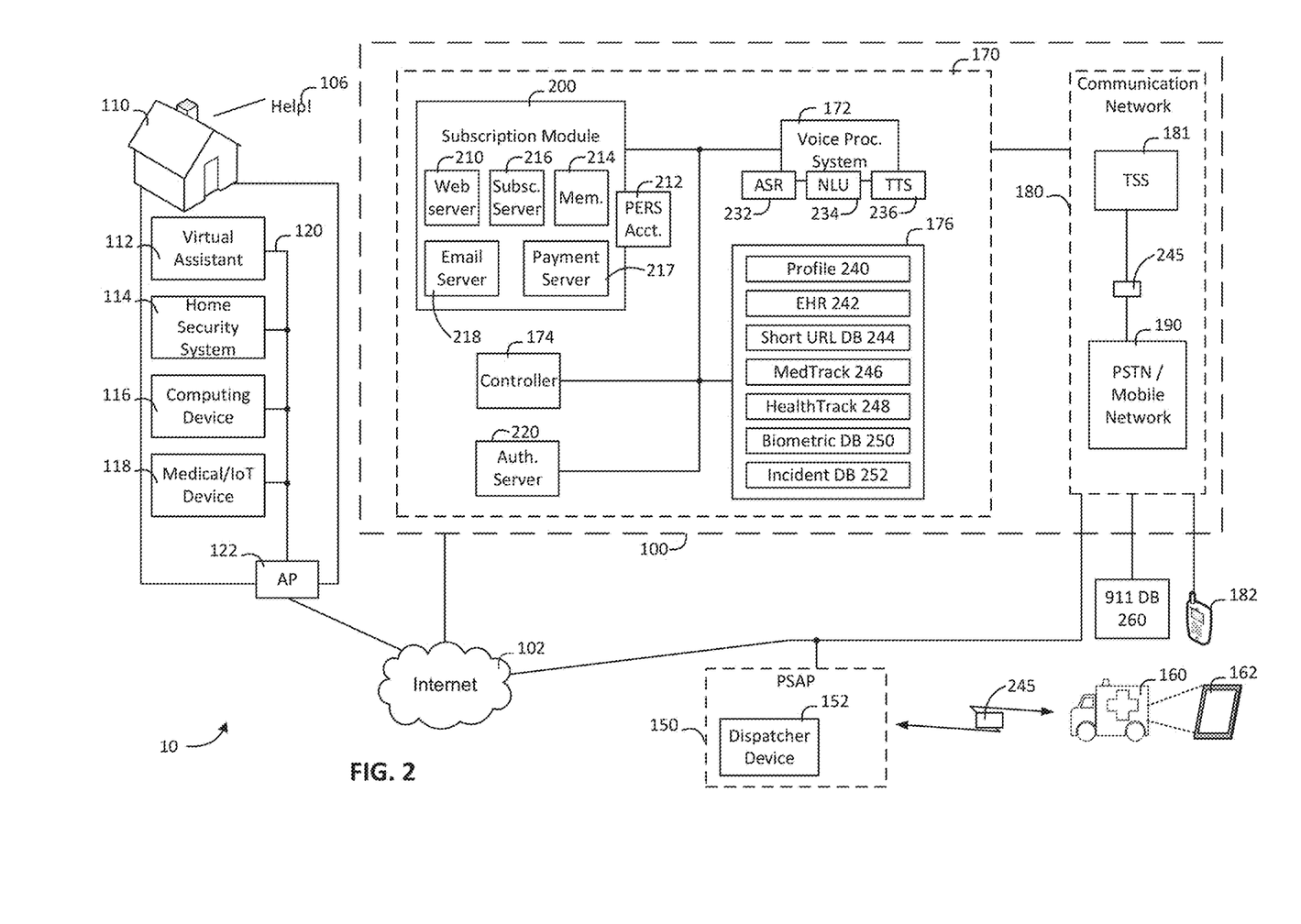
FIG. 2 is a graphical representation of a system for transmission of emergency calls and dispatch of emergency services including a more detailed.

FIG. 2 is a graphical representation of a system for transmission of emergency calls and dispatch of emergency services including a more detailed functional block diagram of the personal emergency response system of FIG. 1.

In some embodiments, the home 110 can have a home security system 114. The home security system 114 can be a system or collection of systems and subsystems configured to provide home security. Such systems can include motion sensors, cameras, intrusion alarms, and door and window sensors that are activated in the event of a home invasion, fire, or other emergency circumstances. The home security system 114 can be a self-contained system operated by, for example the inhabitants of the home 110. In some examples, the home security system 114 can be continuously monitored, such as by a 24 hour/7 days a week home security monitoring company.

The home 110 can have a computing device 116. The computing device 116 can be, for example, a home computer, a smartphone, a tablet, or other wired or wireless internet-connected device. As used herein, the computing device 116 may refer to fixed or mobile computing devices. The computing device 116 can be, for example, coupled to the home security system 114 and receive notifications or data in the event an associated sensor is activated. For example, the computing device 116 (e.g., the user's mobile device) can receive video from a security camera in the home 110 or other data regarding window or door sensors comprising the home security system 114. A user may not always be in the home 110 with a smartphone, for example, however, for ease of description, the user and the computing device 116 (or other mobile electronic communication device) may be assumed to be present in the home 110 for use with the PERS 100.

The home 110 can further have at least one Internet of Things (IoT) device 118. The IoT device 118 can be, for example, in-home, smart medical devices such as, a blood glucose meter, blood pressure, pulse oximeter, scales or body fat analyzers, and various fitness wearables, among other devices. The IoT device 118 can further include sensors the user places in the home to detect the operation of various appliances or devices (e.g., a smart coffee maker, refrigerators, mattress pad, and other smart appliances). The IoT device 118 can further be, for example, smart-home devices such as "smart" thermostats, smart air ducts or air vents, lights, and other appliances. In some implementations, the IoT device 118 can be a smart thermostat or other device that can cooperate with the home security system 114 to provide information about the environmental state of the home 110.

Each of the virtual assistant 112, the home security system 114, the computing device 116 and the IoT device 118 can be coupled together by a home network 120. The home network 120 can be a wired or wireless network for communication of data between the various attached devices. The home network 120 can be coupled to a home access point (AP) 122 that provides access to the internet 102.

The home network 120 can be coupled to the CRS 170 (FIG. 1). The CRS 170 can have a subscription module 200. The subscription module 200 can have one or more servers and databases for receiving, storing, and maintaining information regarding user subscriptions, user profiles, billing and payment information, and other data associated with a services provided by the PERS 100.

In some embodiments, the subscription module 200 can have a web server 210. The web server 210 can represent one or more servers associated with the PERS 100. The web server 210 can render web pages and provide access (e.g., a graphical user interface) to the user (e.g., a subscriber) after securely logging in to a PERS account 212. The PERS account 212 can be stored in a memory 214 accessible by a subscription server 216 and the web server 210. The memory 214 can be one or more memories or databases configured to store subscription-related information. The user subscription (e.g., the PERS account 212) can be accessed with access credentials, such as a user name and password, biometric input, or other means. A subscription can be purchased for the PERS account 212 via the web or various mobile apps. For example, such a service can be provided by Amazon Web Services and purchased through the PERS account 212 or other applicable Internet or web portal.

Subscriptions, and the PERS account 212 more broadly, can be managed by the subscription server 216. The subscription server 216 can store and manage the PERS account 212 based on input from the user/subscriber. The subscription server 216 can communicate with a payment server 217 to verify, for example, that the PERS account 212 is current or not delinquent. Such verifications can be periodic or occur when the PERS 100 is accessed. The subscription server 216 can further access information about payment receive status.

The subscription module 200 can also have an email server 218. The email server 218 can transmit and receive subscription-related communications (e.g., initial subscription activation, declined transaction notices, payment card expiry notices, premises address validation, etc.) to the subscription server 216.

The CRS 170 can also have an authentication server 220. The subscription module 200 can communicate with the authentication server 220. The authentication server 220 can register and authenticate, among other things, the virtual assistant 112, the home security system 114, the computing device 116, and the IoT device 118 as devices related to the PERS 100. During authentication, the authentication server can issue access tokens for each unique session, for example, when the subscriber accesses the PERS account 212. In some embodiments, the authentication server 220 can be a part of the subscription module 200.

The CRS 170 can further have the voice processing system 172 (FIG. 1). The VPS 172 can be communicatively coupled to the home 110 via, for example, the Internet 102. In some embodiments, the VPS 172 can receive data from the virtual assistant 112, the home security system 114, and/or the IoT device 118. The VPS 172 can have, or be coupled to, one or more processors (e.g., the controller 174). The VPS 172 can have an Automatic Speech Recognition processor (ASR) 232 configured to convert speech to text or data. The VPS 172 can also have a Natural Language Understanding processor (NLU) 234 configured to recognize the intent of communications from the subscriber speaking to the virtual assistant 112, for instance. The VPS 172 can have a Text-to-Speech processor (TTS) 236 configured to convert text to speech. The VPS 172 can use the ASR 232, the NLU 234, and the TTS 236 to provide two-way communication between the oral or audio-based communications of the virtual assistant 112 in the home 110 and the text or data-based systems of the PSAP 150 and the emergency responder 160, for example, and more generally, the PERS 100. Certain responses can require context analysis of the verbal communications received at the virtual assistant 112. The VPS 172 (e.g., the NLU 234) can provide such context analysis, enabling the PERS 100 to determine the intent of the emergency communication 106, for example, so as to provide an appropriate response.

The CRS 170 can further have the DMS 176. The DMS 176 can have a series of databases or other memories operable to store, maintain, and provide access to information related to the PERS 100. The controller 174 can, in conjunction with the DMS 176 aid in the maintenance of the various databases within the DMS 176 in addition to executing database queries for various functions of the PERS 100. The DMS 176 can also have a web server (not shown, but similar to the web server 210) configured to provide access to and display the various data stored therein to authorized personnel. The data accessible from and stored by the DMS 176 can facilitate dispatch of emergency services (e.g., the emergency responder 160) in response to the emergency communication 106. The data stored within the DMS 176 and it subcomponents can further provide the PSAP 150 and/or emergency responder 160 with information related to the subscriber and/or the emergency, for example. This can aid in tailoring a measured response to the emergency communication 106.

The DMS 176 can have a profile 240. The profile 240 can also be referred to herein as a profile database. The profile 240 can store user preferences and can have a 911-Enabled personal health record (PHR). Accordingly, the profile 240 can represent a collection of data associated with a given subscriber or subscribers. The profile 240 can be associated with one or more memories to store personal information and medical information (e.g., PHR) related to an individual subscriber. Personal information, as used herein, can generally refer to particular pieces of information or data related to the user. Personal information can include physical data, personal or emergency contacts, health-related information, and/or information used to identify or locate the user/subscriber.

The profile 240 can be a cloud-based, securely accessible data repository (e.g., a memory). The subscriber can access his or her PERS account 212 to initialize, update, or maintain any necessary information stored within the profile 240.

The profile 240 can also include various pieces of personal or medical Information. In some embodiments, the profile 240 can include basic personal information such as name and identifying photo of the person in need of assistance (e.g., the user/subscriber), address of the home 110, phone number(s), email address(es) or other contact information, age, date of birth, blood type, body weight, height, and Social Security Number among other data. The profile 240 can receive and store other medical information associated with the PHR such as, health insurance provider information, medical history, allergies, medical devices (e.g., a pacemaker), physician contact information, recent hospitalizations or surgeries, list(s) of prescription medications and over-the-counter medications taken, and blood glucose, blood pressure, electro cardio gram (EKG), electromyography (EMG) readings, pulse oximeter readings, emergency contact information, advanced medical directives, and do not resuscitate (DNR) orders among other available data, as needed.

The address of the home 110 can be, for example, a verified and exact premises address (e.g., of the home 110) validated against a National 911 Address database (911 DB) 260. The address information can also include, for example, the nearest cross streets on either side of the premises (e.g., the home 110), a Google Maps thumbnail image and/or a link to a Street View visualization of the home 110. The profile 240 can further include other premises information, such as codes to keyless entry front door lock or key lock box, a location of nearest fire hydrant or if there is a connection inside the building.

The profile 240 can also include various special needs of the user. In some embodiments, the profile 240 can include accessibility information related to the user, such as wheel chair or other assistive devices, or any mobility restrictions (e.g., range of motion or ambulatory status).

The profile 240 can further include information related to other special needs/circumstances such as post-traumatic stress disorder (PTSD), autism, dementia, Alzheimer's, or any other behavioral health issue(s). The profile 240 can also include information related to any triggers that upset the user (e.g., flashing lights, loud noises), and methods that can be used to calm the user (e.g., discussing a user interest). For example, the user's special needs could indicate to emergency responders that the individual is a veteran with PTSD. Accordingly, certain behavioral triggers such as loud noises, bright lights, sirens that might be characteristic of PTSD can be avoided or muted as the emergency responder 160 approaches the home 110.

The user can update the profile 240 as needed to include the above information but also other medical-information stored externally in one or more physician maintained electronic health records (EHR) 242. The user can also include connected health data from wearable devices (e.g., Fitbit).

Portable Document Format (.pdf) files or images regarding health records can be uploaded by the user. For example the profile 240 can also store X-rays, blood tests, magnetic resonance imaging (MRI), positron emission tomography (PET) scans, etc. This information can be downloaded or otherwise accessed at the PSAP 150 or by the emergency responder 160 in a 911 emergency. In some embodiments, the subscriber can provision or update his or her profile 240 for the PERS account 212 via the computing device 116. Using a secure Internet connection (e.g., HTTPS) or an otherwise secure Internet transport connection, the subscriber can access the PERS account 212. The subscriber can purchase a subscription to the PERS 100 via the subscription module 200. In some embodiments, the subscriber, a caregiver, or a guardian, can set up an account and register a home address, for example, where the PERS 100 will be primarily used. The subscriber can enter the certain personal information, and one or more emergency contacts (e.g., relatives, friends, neighbors, or assisted-living personnel). Other information can be entered such as the emergency contacts' relationships to the subscriber (e.g., son, daughter, parent, girlfriend, etc.) and contact numbers (e.g., mobile and landline). The PERS account 212 (and the profile 240) can also receive and specify information about a contact ranking. For example, the subscriber may wish to have the PERS 100 contact the listed emergency contacts in a specific order. The PERS 100 (e.g., the controller 174) can access this information when required for call routing or requested by an authorized person.

Personnel authorized to access or maintain the profile 240 can be designated by the subscriber. The subscriber can have ultimate control of access to the PERS account 212 and the profile 240. The subscriber can further grant or revoke permission to a doctor or other health care professional as needed. Access can also be limited to some or a portion of the data contained in the profile 240. The subscriber can also grant permission to a third-party monitoring service for smart medical device data, such as EKG monitoring. Such a monitoring service could warn the subscriber in the event actual data observed was out of expected ranges that could indicate the onset of a condition requiring the attention of a medical professional.

Through the PERS 100, information stored in the profile 240 or PHR can be shared with the PSAP 150 and the emergency responder 160 via the communication network 180 (e.g., the TSS 181). The subscriber can select what information is to be shared, and what information is searchable by, for example, a dispatcher at the PSAP 150, the emergency responder 160, hospital emergency rooms, physicians, and/or other organizations or services.

The DMS 176 can have an electronic health record (EHR) 242. The EHR 242 can be one or more electronic records storing an electronic version or log of the subscriber's (e.g., the patient's) medical history. Individual medical providers may maintain an individual EHR 242 for specific medical disciplines. For example, the user may see a cardiac specialist who maintains a first EHR 242 (e.g., Cerner) and a dermatologist that maintains a second EHR 242 (e.g., Epic). The EHR 242 may be an individual database of data that a healthcare provider maintains. The EHR 242 can represent many different databases that do not easily communicate with one another. Some of the information within the EHR 242 may overlap with, or be similar to, that contained within the profile 240.

The EHR 242 can be updated and maintained by one or more health care providers over time. The EHR 242 may include key administrative clinical data relevant to that subscriber's care under a particular provider, including, for example, demographics, progress notes, problems, medications/prescriptions, vital signs, past medical history, immunizations, laboratory data, and radiology reports, among other data. Other information may also be included in the EHR 242 as requested by the subscriber. Certain portions of the EHR 242 can also be imported to the profile 240 as needed by the subscriber. The EHR 242 can be accessed by an authorized list of users, for example, an authorized medical provider.

In some embodiments the EHR 242 can be created, augmented, and/or updated by medical professionals. In some embodiments, the subscriber may not be able to independently (e.g., without additional authorization) remove or delete certain medical history data or information from the EHR 242. In some embodiments, preferences set by the subscriber, in for example, the PERS account 212, can govern how information within the EHR 242 is shared and/or maintained. The EHR 242 can be restricted in the entering, storing, and access of personal medical information to people and organizations that the individual, caregiver, or guardian consents to access.

The DMS 176 can also have a short universal resource locator (URL) DB 244. The short URL DB 244 can store a plurality of short URLs that are assigned to subscribers, their respective PERS account(s) 212, and personal medical history and records (e.g., the EHR 242 and the profile 240). In some embodiments, each subscriber can be assigned a unique, short URL 245 comprising a limited number of characters, for example, "911.ai/1RLFwZ6A." The U.S. telecommunications infrastructure limits caller identification (ID) numbers to 15 characters. Thus, when queried, the short URL 245 from the short URL DB 244 can be inserted into the TSS 181 trunk line in place of, for example, the Caller ID Number that would normally be displayed to the receiving party. In such an example, caller ID numbers may be limited to 15 total characters. Thus the short URL 245 can comprise a URL with 15 characters or less that can be displayed on, for example, a display at the PSAP 150 showing caller ID information. The short URL 245 can provide a temporary link to the subscriber's profile 240, thus providing the emergency responder 160 with the subscriber's relevant medical history viewable from the emergency responder device 162. For example, the profile 240 can be coupled to a web server (not shown) configured to render the information stored therein as a user-viewable webpage or other portal.

In some embodiments, upon provisioning of the PERS account 212, the subscription module 200 can verify the address of the home 110 with the 911 DB 260. This can ensure that the PERS 100 may correctly route emergency responders to the home 110. The 911 DB 260 can represent, for example, the National 911 Profile Database maintained within the Office of Emergency Medical Services at the National Highway Traffic Safety Administration (e.g., part of the U.S. Department of Transportation). The home 110 can then be assigned the short URL 245 from the short URL DB 244. The 911 DB 260 can be queried via the PSTN 190. In some embodiments the 911 DB 260 can also be a portion of the DMS 176.

In some embodiments, the PSAP 150 can have a computer aided dispatch (CAD) system that can retrieve information from the 911 DB 260 and present such data and information for display to 911 telecommunicator on the dispatcher device 152. The dispatcher device 152 can receive an audio recording from of the subscriber's request to the virtual assistant 112 as a .wav, .mp3 or other appropriate audio file format from the VPS 172.

When the virtual assistant 112 initiates a phone call to 911 in response to the emergency communication, the website or the link to the website provided by the short URL 245 is activated for viewing the individual's personal health record. The dispatcher device 152 can then display and the 911 telecommunicator can then view a web page linked by the short URL 245 by either clicking on the short URL 245 via the dispatcher device 152, or copying and pasting the short URL 245 into a web browser.

Depending on the nature of the medical emergency, the 911 telecommunicator may determine it is necessary to share the individual's personal health record in the profile 240 with emergency responder 160 (for view on the emergency responder device 162, for example), hospital emergency room, and/or other appropriate organizations or services. To share the short URL 245, the 911 telecommunicator may send an SMS message, MMS message, instant message, or email to a mobile phone, tablet or computer of a person related to the emergency response. Access to such information can be limited based on various factors such as IP addresses, media access code (MAC) addresses, and the like to comply with, for example, HIPAA requirements.

In some embodiments, the short URL 245 may be active for a single-use. To protect the individual's privacy and for security purposes, the short URL 245 can be automatically deactivated for use in the PERS 100 a period of time (e.g., hours) after initial activation of the short URL 245 and associated website. In some other embodiments, the "single-use" aspect of the can also mean that the short URL 245 can only be accessed a predetermined number of times (e.g., limited number of "clicks" from a single computer) or for different periods of time based on identity (e.g., physician, first responder, the emergency responder 160, IP/MAC address etc.).

In some embodiments, at the time the virtual assistant 112 places a call to 911, the controller 174 can cause SMS or other type of text messages to be sent to the emergency contacts for that individual identified in their respective PERS account 212 (e.g., profile data or the profile 240). The virtual assistant 112, via the controller 174, can also place a phone call to the mobile phone, or other designated phone number, designated as persons in the profile 240 to be contacted in an emergency.

In an embodiment each individual PERS subscriber can be assigned a dedicated trunk phone line which is only used for placing calls to 911. Such a dedicated line can be presented through a SIP (Session Initiation Protocol), or other protocols such as, for example, Inter-Asterisk eXchange, H.323, and Jingle. When the virtual assistant 112 initiates a phone call to 911 via the communication network 180 or the TSS 181, the call is automatically routed over the PSTN to the closest PSAP 150 based on, for example, the individual's verified physical address (e.g., of the home 110).

In some other embodiments, the home security system 114 can cooperate with the virtual assistant 112 to provide a silent alarm capability. The subscriber can also store, for example, an innocuous-sounding phrase to indicate that the subscriber may be in danger. In the event of a home invasion by an intruder or other police emergency (e.g., threat of physical harm by a resident with a behavioral health condition), the subscriber can speak the silent alarm phrase that can then be received by the virtual assistant 112 (and the TTS 236), This can trigger a silent alarm to 911 via the PERS 100. The short URL 245 provided to 911 (e.g., the PSAP 150) can include a notification of a police emergency and that a silent alarm was issued by an individual at the home 110. Individual residents within the home 110 can each have a unique phrase to indicate their identity to 911. This information can be stored within the profile 240 and correlate with other information stored within the PERS account 212, such as special needs or behavioral health conditions.

The DMS 176 can have a medical tracking database (MedTrack) 246. The MedTrack 246 can store information related to the PERS account 212, specific to user prescriptions, for example. The subscriber can access the PERS account 212 and initialize or update their profile database 440 with prescription medication, including but not limited to, for example, name, dosage, strength, prescribing physician and contact information, reason for taking, date started taking, how taken, prescription quantity, number of refills, etc. The MedTrack 246 can also include, for example, pharmacies or pharmacy benefit providers or prescribing physician's Electronic Health Records and/or Continuity of Care Documents.

The MedTrack 246 can track a subscriber's habits with respect to timely taking required medications in accordance with doctor's order or other medical advice. The controller 174 can periodically query the MedTrack 246. Subscribers can then receive voice notifications in the form of a question from the virtual assistant 112 via, for example, the TTS 236 based on such queries. The virtual assistant 112 can ask the subscriber whether a particular medication has been taken in accordance with a prescription. The subscriber can verbally confirm the medication was or has been taken by speaking to the virtual assistant 112. The controller 174 can then record such confirmation in a respective MedTrack 246. In the event the subscriber fails to confirm a given medication has been taken, in some examples, the subscriber's emergency contacts stored in the profile 240 can be contacted (by e.g., the controller 174) via a text (e.g., SMS, MMS) notification.

The MedTrack 246 may primarily be a subscriber tool based on the virtual assistant 112. The MedTrack 246 can provide information about the user's adherence to doctors' order (adherence data) to various family members, guardians, caregivers and home health aides via text, email, or other means. This information can be stored in the profile 240, for example. The subscriber, or care recipient, may also receive positive reinforcement for adhering to their medication regimen. Lack of adherence may necessitate an intervention, such as the aforementioned provision of instructions on the importance of taking proper dosages at prescribed intervals.

In some embodiments, the controller 174 may periodically query the MedTrack 246 and request a confirmation from the subscriber (via the virtual assistant 112) to count a particular medication in a pill bottle. The voice-based queries can be sent via the VPS 172 and the virtual assistant 112. The subscriber can then verbally confirm a given quantity of the requested medication to the virtual assistant 112. This can then be updated in the MedTrack 246. In the event deviations from actual quantity versus the expected quantity are encountered, the controller 174 can indicate such information in the MedTrack 246. Such a record can prompt an attending physician or other health care staff, for example, to provide the subscriber with follow-up instructions regarding the importance of prescription medication adherence.

In some embodiments, the controller 174, upon querying the MedTrack 246, can also provide voice-based prescription refill and pick up reminders. The controller 174 can use the MedTrack 246 to notify the Subscriber via the TTS 236 on the virtual assistant 112 when medications need to be refilled and/or picked up at the pharmacy. A preferred list of pharmacies can be included in the profile 240.

The DMS 176 can have a health tracker DB (HealthTrack) 258. The HealthTrack 248 can connect in-home smart medical devices (e.g., the IoT device 118) to health care professionals via the internet 102.

In some embodiments, the controller 174 can receive data from the IoT device 118, including smart home health medical devices. The IoT device 118 can be, for example, Bluetooth and/or WiFi enabled scales, body fat scales, blood pressure reading or monitoring devices, Holter monitors or other wearable continuous electro encephalograph (ECG)/ electro cardio gram (EKG) monitors, pulse oximeter, fitness wearables and, health tracking devices, among other devices.

The virtual assistant 112 can couple to the IoT device 118 to receive various health-related data and transmit the data to the CRS 170 (and the controller 174) for update to the DMS 176. The virtual assistant 112 can transmit and receive voice data to and from the subscriber, but also send and receive sending health tracking data and other Protected Health Information (PHI) over the PERS 100 in a HIPAA compliant manner.

The DMS 176 can further have a biometrics DB 250. The biometrics DB 250 can receive and store information related to biometric, facial, voice recognition, or other information. The biometrics DB 250 can store various bits of information such as a photo database of residents of the home 110, authorized service providers (e.g., a housekeeper, a dog walker, or a home health aide). This information can be related to the home security system 114, for example. The subscriber can maintain or augment the biometrics DB 250 by uploading photos of authorized individuals from, for example, the computing device 116. Biometric Voice Prints can be entered via the virtual assistant 112 using, for example, a personal identification number (PIN) or other authentication processes.

The DMS 176 can have an incident DB 252. The incident DB 252 can store information related to the emergency communication 106, an alert from the home security system 114, or other information relating to the PERS 100 and/or dispatch or services based on the emergency communication. The controller 174 can create an incident report that can then be store in the incident DB 252 and later recalled for reference. In some examples, the incident report can represent one emergency event. All transactions or occurrences relating to a given emergency event will be associated with the incident report within the incident DB 252. The PERS 100 can minimize false alarms, however in the event there is a false alarm and an a penalty charge is imposed by the respective emergency responder 160, the incident DB 252 can serve as a record of the event. Because the subscriber may be held responsible for false alarm penalties in accordance with various terms of service, the subscriber can be billed directly via the subscription module 200, for example. The incident DB 252 can also serve as internal record for liability insurance purposes to track dates and times of events.

In some embodiments, the home security system 114 can be a monitored service that can have live call center agents to attempt to verify an intrusion with the home owner/user before contacting the nearest police department by telephone. The agents must verbally convey premises location and the nature of the emergency, whether police or fire, a time consuming and potentially error prone process. In some embodiments, the monitoring service can contact an appropriate responder when the hardware devices of the home security system 114 indicate a potential intrusion, fire, or other emergency is detected by the associated hardware.

In some embodiments, the home security system 114 can include a smart home device, such as a motion sensor and/or video camera that can transmit push notifications to a user's mobile device when a potential intrusion is detected via the aforementioned hardware. The user can view the video on their mobile device and then call the police if an intruder is observed. A shortcoming with this approach is the user may not see or act upon the notification in a timely fashion.

Some home security systems can have a high false alarm rate, as high as 98% on a nationwide basis. As a result, some responders, such as police departments, may require a verified response from some alarm companies before sending officers to the location of the alarm (e.g., the home 110). An example of a verified response is remote observation of the structure or building using a visual monitoring system that captures video or other evidence of the intrusion for review prior to dispatch of the emergency responder 160. The verified response can corroborate an indication from the home security system 114.

In some embodiments, the PERS 100 can capture the audio and video from the home security system 114 and store it in the incident DB 252. This information can also be stored in the profile 240 for later reference. When the home security system 114 detects an intrusion, the PERS 100 can forward the short URL 245 to the PSAP 150, providing access to images and video captured in the home 110.

In the event of an intrusion at the subscriber's premises address, for example, the home security system 114 can provide an alert to the PERS 100. In response to the alert from, for example, a video camera, the controller 174 can query the biometrics DB 250 to run a biometric facial recognition and associated calculations and analyses of individuals appearing in the video. The controller 174, for example, can reference this information against the biometrics DB 250. In the event the system detects an intruder (e.g., no match results from the biometrics DB 250 query), the controller 174 can cause a transmission to be sent to, for example, the PSAP 150. The biometrics DB 250 can store still images, video, and/or audio recordings of the one or more intruders. The information can then be accessed when needed by the controller 174, and provided to the dispatcher device 152 and the emergency responder device 162, for example. In some embodiments, this information can be made available to the emergency responder 160 (via, e.g., the PSAP 150) using the short URL 245 described above. Such a system and method can provide a verified response to the PSAP 150, reducing the rate of false alarms.

In some other implementations, the IoT device 118 can also provide additional information to aid in an emergency response. Certain data from, for example, a smart thermostat can provide an indication of where in the home 110 a fire is. In addition, this can further trigger other smart home devices, such as a smart air duct or vent to shut off and limit circulation of air within the home 110. Such data derived from the IoT device 118 can be saved to the incident report in the incident DB 252. This information can be made available via the short URL 245 to, for example the fire department to tailor their response.

The information provided by the IoT device 118 and the home security system 114 for example, can be further correlated with known building layouts. The user can upload a schematic of the home 110 to the profile 240, for example. In a private setting such as the home 110, or in a commercial setting, such information can further be known via public records or be otherwise accessible to the PSAP 150 and the emergency responder 160.

Figure 3:
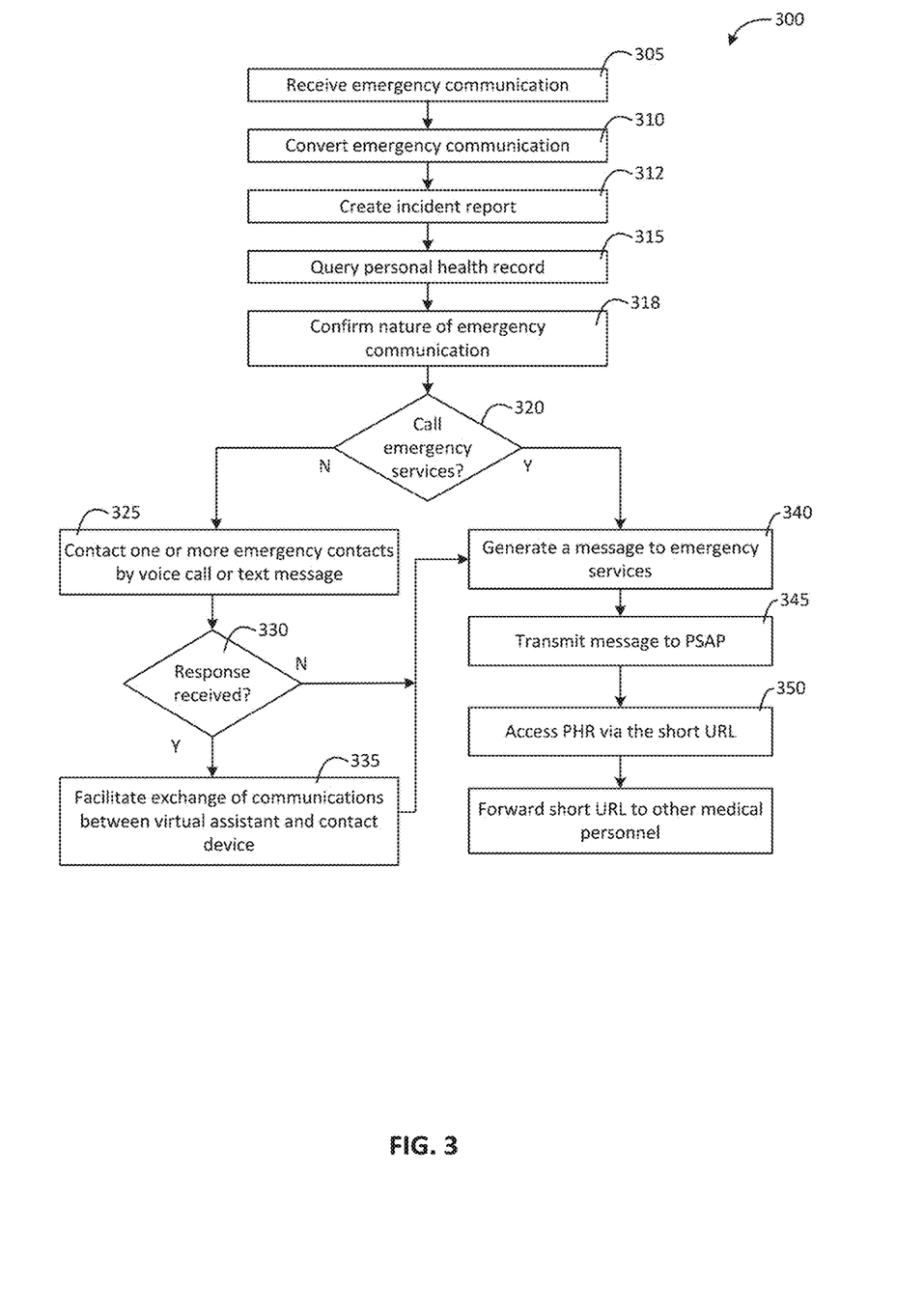
FIG. 3 is a flowchart of a method for transmission of an emergency service request and dispatch of emergency services.

FIG. 3 is a flowchart of a method for dispatching a responder in the system of FIG. 1 and FIG. 2. A method 300 can begin in block 305 when a person (e.g., the user, subscriber) reports an urgent situation or an emergency situation to the virtual assistant 112. The virtual assistant 112 can receive the emergency communication 106 from, for example, the subscriber in the home 110. For example, the user could say, "Alexa, tell Alert that I have fallen." In such an instance, the virtual assistant can be "Alexa" and the PERS 100 can be referred to as "Alert." For ease of description, many of the steps of the method 300 may described as being performed by the controller 174. As noted above, the controller 174 can comprise one or more distributed processors or various cloud computing components.

At block 310, the virtual assistant 112 can use the CRS 170, and more specifically, the VPS 172, to convert the received audio of the emergency communication into a data stream that it can transmit to the PERS 100.

At block 312, the controller 174 can create an incident report in the incident DB 252 based on the emergency communication 106. Such an incident report can represent a single emergency event (e.g., described by the emergency communication 106). All transactions relating to the emergency event can be associated with the incident in the incident DB 252.

At block 315, the controller 174 can query the profile 240 to retrieve information regarding the user's preferences stored in the profile 240. For example, the controller 174 can query registered emergency contacts. The controller 174 can then form a communication that is transmitted back to the virtual assistant 112 (via, e.g., the VPS 172) as a spoken communication confirming whether the user needs emergency assistance or whether a call to an emergency contact is requested. For example, the controller 174 (via the virtual assistant 112) can respond to the emergency communication 106 with, "Do you want me to call your son, David? Should I call one of your other contacts? Or should I send for an ambulance?" The user can answer with an appropriate request. For ease of description, the communications may be described in terms of the user and the virtual assistant 112. However, in reality, the controller 174, the VPS 172, and other aspects of the CRS 170 and the PERS 100 may actually be performing at least part of the method.

At block 318, the PERS 100 through the virtual assistant 112, can confirm the nature of the emergency communication. In some situations, there can be more than one spoken exchange between the user/subscriber and the virtual assistant 112. For example, if the virtual assistant 112 is unable to understand the user's request, then the virtual assistant 112 may verify the request with a qualifying response, until the virtual assistant 112 and/or the VPS 172 (and e.g., the NLU 234) has determined the action desired by the user. In some examples, the virtual assistant 112 can default to simple yes or no questions in the event a user command is unclear. If no response is received from the emergency contacts, or no emergency contacts respond that they can aid the user, the PERS 100 may have a default setting whereby 911 is called.

If at decision block 320 the virtual assistant 112 receives a communication from the user indicating that no emergency services (e.g., fire, police, ambulance, etc.) are needed, the virtual assistant 112 can confirm that a call will be placed to the user's preferred emergency contacts in the profile 240, for example. This can include sending a message alerting the user's son, David, as described in connection with block 315, 318.

At block 325, the controller 174 can, based on the emergency contact information in the profile 240, use the communication network 180 (e.g., the TSS 181) to facilitate transmission of a text message (e.g., to the user's son, David) and/or placing an automated phone call to the selected emergency contact's phone. This can form a communication link between the emergency contact's phone and the virtual assistant 112. The virtual assistant 112 can thus become similar to a speaker phone for the user to communicate with the requested emergency contact using the virtual assistant 112. In some embodiments, the PERS 100 may attempt to contact specific emergency contacts one at the time (e.g., in order of a priority), or all responders simultaneously If a text message (e.g., an SMS) is sent, it can prompt the emergency contact(s) to click on a link which opens a web interface (e.g., on the contact device 182). The emergency contact may be prompted to indicate, via the web interface on the contact device 182, whether he or she can assist the user, and how long it may take him or her to get to the home 110.

In some embodiments, the controller 174 can enable the emergency contact to send a response to the SMS. The communication network 180 (e.g., the TSS 181) can then forward the response back to the controller 174 that can then generate a message to the user. For example, "Your son David writes: 'I'm on my way, as fast as I can. I think I can be there in less than ten minutes." The virtual assistant 112 can then speak the contents of such a response to the user.

A variant of the system can allow the emergency contact to speak a message to the user when responding to the automated phone call. This message can be sent to the user via the virtual assistant 112 (and the VPS 172) as a recording, or converted to text by means of the natural-language-understanding processing service (e.g., the NLU 234) and then converted back to speech by the VPS 172 (e.g., the TTS 236).

If an automated phone call is placed, the virtual assistant 112 can use the VPS 172 to prompt the emergency contact to answer the same questions as the SMS mentioned above. The communication network 180 (e.g., the TSS 181) can facilitate the transmission of information between the virtual assistant 112 (e.g., the user) and the contact device 182 (e.g., the emergency contact). Full two-way communication between the virtual assistant 112 and the contact device 182 (by speech or text) is possible.

If, at decision block 330, the emergency contact enters the requested information into the contact device 182 in response, the controller 174 can then construct an audible response for transmission by the virtual assistant 112 within the home 110 indicating that the emergency contact has received the message and is enroute. At block 335, the controller 174 can enable the two-way communication (e.g., text or voice) between the virtual assistant 112 and the contact device 182. For example, "Your son David says he can be here in less than twenty minutes. Is that soon enough, or should I also call someone else, or send for an ambulance?" The user can respond as needed.

If, at decision block 330, the emergency contact does not respond to the SMS or automated phone call, or if the emergency contact indicates that he or she is unable to assist at the home 110 in block 335, then the controller 174 may communicate such status back to the user via the virtual assistant 112.

If, after block 335 no emergency contact is available or if at decision block 330 no response is received from any emergency contact, the method 300 can default to contacting emergency services (e.g., the PSAP 150, or 911) at block 340.

Also, if at decision block 320 the emergency communication 106 affirmatively indicates a user request for an ambulance, police assistance, or report a fire, the method can move to block 340.

At block 340, the controller 174 can generate a message for transmission to 911 emergency services for receipt at the PSAP 150. The controller 174 can query the DMS 176 to determine the user's name and address from the profile 240 to provide the proper information to the PSAP 150 at block 340.

At block 345, the controller 174 can transmit, via the communication network 180 (e.g., the TSS 181), the message to the PSAP 150. For example, based on the situation, the controller 174 may cause a text message to be sent to the PSAP 150: "Jane Doe, at 555 Main Street, Some Town, requests an ambulance." The communication can be sent as a text-based request via the communication network 180 (e.g., the TSS 181). The communication network 180 (e.g., the TSS 181) can route the emergency request to an appropriate 911 emergency call center (e.g., the PSAP 150), based on the address of the home 110.

In some embodiments, the PERS 100 can allow communication (via virtual assistant 112) with the user to continue, periodically informing the user how much time remains before the emergency contact or emergency services arrive.

The PERS 100 can further inquire with the user via the virtual assistant if any other action needs to be taken, such making additional calls.

In an embodiment, if the user stops responding to the virtual assistant 112, the PERS 100 can request an ambulance, for example, if one has not already been dispatched. The PERS 100 can further end a conversation when the user indicates that help has arrived or is no longer needed. PERS 100 can also end the conversation when the emergency contact or emergency services indicates arrival at the home.

In some other embodiments, the contact device 182 can further provide position information to the controller 174. The controller 174 can then further terminate the connection with the virtual assistant 112 when the position information of the contact device 182 indicates that it has arrived at the home 110.

The controller 174 and the subscription module 200 can maintain open access to the incident report created until the user or the responder reports arrival via, for example, the virtual assistant 112.

In some embodiments, the controller 174 can further poll all open incident reports. If an incident report has not been closed within a predetermined amount of time, the controller 174 may initiate an automated phone call to 911 Emergency Services, as described above.

In some embodiments, the virtual assistant 112 can have other wireless connection capabilities, such as Bluetooth, ZigBee, WeMo, among other wireless protocols. For example, the virtual assistant 112 can actuate smart door locks. Thus, when the user requests assistance via the PERS 100, any automated door locks in the home 110 can be unlocked to permit entry to the emergency personnel. This can be done either automatically, via the profile 240 and the short URL 245, or at the user's request.

The advantages of the PERS 100 include, for example, that the user can call for assistance at any time, from anywhere within the home, without the need of wearing any device. The user can easily, using normal spoken language, choose among many different emergency contact or emergency services, without there being any need for costly call-center services.

The PERS 100 provides automated, voice-controlled Personal Emergency Response System utilizing a natural-language-understanding and text-to-speech service to contact emergency services and provide information to first responders to more appropriately deal with the emergency situation.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative functional blocks, modules, and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, functional blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for initiating a personal emergency communication to provide a measured medical response, comprising:
   storing personal information for one or more emergency contacts to a profile of a user in a computer memory, the profile further including a personal medical history of the user and location of a user premises;
   receiving an emergency communication via a virtual assistant, the emergency communication being spoken to the virtual assistant by the user in the user premises, the emergency communication indicating one of an urgent situation and an emergency situation;
   processing the emergency communication at a voice processing system coupled to the virtual assistant to determine the nature of the emergency communication and translate the emergency communication into an emergency data message, the emergency data message having a digital representation of information related to the emergency communication;
   if the emergency communication indicates an urgent situation, the urgent situation being non-life threatening,
      transmitting, via a communication network, the emergency data message to an emergency contact based on the contact information in the memory, and
      transmitting a message to the virtual assistant indicating that at least one message has been transmitted to the one or more emergency contacts saved in the computer memory; and
   if the emergency communication indicates an emergency situation,
      temporarily linking a short universal resource locater (URL) from a short URL database to the profile of the user
      appending the short URL to the emergency data message, the short URL providing a temporary link to the profile of the user,
      transmitting, the emergency data message including the short URL to a public safety answering point (PSAP) via a public switched telephone network (PSTN) of the communication network, and
      transmitting a message to the virtual assistant indicating that an emergency service provider has been contacted.

2. The method of claim 1 further comprising determining a location of the user within the user premises based on a physical location of the virtual assistant.

3. The method of claim 1 wherein the short URL is transmitted as caller identification information.

4. The method of claim 1, further comprising transmitting the emergency data message to the one or more emergency contacts if the emergency communication indicates an emergency situation.

5. The method of claim 1, wherein the voice processing system comprises a natural language-understanding service and a speech-to-text service.

6. The method of claim 1, wherein the emergency communication is received via a voice over internet protocol (VoIP) connection with the virtual assistant.

7. The method of claim 1, wherein the short URL provides access to the profile of the user for a predetermined period of time.

8. A method for initiating a personal emergency communication to provide a measured medical response to a user premises, the method comprising:
   storing personal information about a user in a profile of a computer memory, the personal information including a personal medical history of the user and a location of the user premises;
   receiving an emergency communication via a virtual assistant, the emergency communication being spoken to the virtual assistant by the user;
   processing the emergency communication as a voice over internet protocol (VoIP) transmission at a voice processing system communicatively coupled to the virtual assistant to translate the emergency communication into an emergency data message, the emergency data message including a digital representation of information related to the emergency communication; and
   transmitting the emergency data message via a public switched telephone network (PSTN) to a dispatcher device at a public safety answering point (PSAP), the emergency data message including a short universal resource locater (URL) from a short URL database, the short URL providing a link to the personal medical history and the location of the user premises.

9. The method of claim 8, further comprising receiving a response to the emergency data message from the PSAP indicating receipt of the emergency data message.

10. The method of claim 9, further comprising determining a location of the user within the user premises based on a physical location of the virtual assistant within the user premises.

11. The method of claim 8, wherein the short URL comprises 15 characters or less.

12. The method of claim 8 further comprising
   selecting the short URL from the short URL database;
   associating the short URL with the personal medical history and the location of the user premises; and
   activating the short URL for a predetermined period of time.

13. The method of claim 12 further comprising transmitting the short URL from the dispatcher device to an emergency responder device of an emergency responder dispatched by the PSAP via a text message.

14. The method of claim 8 further comprising transmitting a notification to one or more emergency contacts stored in the user profile in response to the emergency communication.

15. A device for initiating a personal emergency communication to provide a measured medical response to a user premises, the device comprising:
   a memory; and
   one or more processors configured to
      store personal information about a user in a profile in the memory, the profile including a personal medical history of the user and a location of the user premises, receive an emergency communication at a virtual assistant located within user premises, the emergency communication being spoken to the virtual assistant by the user;

processing the emergency communication as a voice over internet protocol (VoIP) transmission to translate the emergency communication into an emergency data message, the emergency data message including a digital representation of information related to the emergency communication;

temporarily link a short universal resource locater (URL) from a short URL database to the profile of the user append the short URL to the emergency data message, the short URL providing a temporary link to the profile of the user, transmit the emergency data message via a public switched telephone network (PSTN) to a dispatcher device at a public safety answering point (PSAP); and receive a communication from the PSAP in response to the emergency data message indicating receipt of the emergency data message.

16. The device of claim 15, wherein the response to the emergency data message further indicates a time enroute to the home.

17. The device of claim 15, wherein the one or more processors is further configured to determine a location of the user within the user premises based on a physical location of the virtual assistant within the user premises and include the location of the user within the user premises in the emergency data message.

18. The device of claim 15 wherein the short URL comprises 15 characters or less.

19. The device of claim 15 wherein the one or more processors is further configured to:
select the short URL from the short URL database;
associate the short URL with the information from the profile; and
activate the short URL for a predetermined period of time.

20. The device of claim 19 further comprising transmitting the short URL from the dispatcher device to a responder device of a first responder dispatched by the PSAP.

* * * * *